United States Patent
Matsumoto et al.

(10) Patent No.: US 11,993,902 B2
(45) Date of Patent: May 28, 2024

(54) WORK MACHINE HAVING A BREATHER DEVICE FOR GEAR CASE

(71) Applicant: HONDA MOTOR CO., LTD., Tokyo (JP)

(72) Inventors: Takuya Matsumoto, Saitama (JP); Yoshitaka Ota, Saitama (JP); Atsushi Moroi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/322,808

(22) Filed: May 24, 2023

(65) Prior Publication Data

US 2024/0019022 A1  Jan. 18, 2024

(30) Foreign Application Priority Data

Jul. 18, 2022 (JP) ................................. 2022-114430

(51) Int. Cl.
*E01H 5/04* (2006.01)
*F16H 57/02* (2012.01)
*F16H 57/027* (2012.01)

(52) U.S. Cl.
CPC ............. *E01H 5/04* (2013.01); *F16H 57/027* (2013.01)

(58) Field of Classification Search
CPC ......... F16H 57/02; F16H 57/027; E01H 5/04; E01H 5/045
See application file for complete search history.

(56) References Cited

U.S. PATENT DOCUMENTS

| 6,065,369 | A | 5/2000 | Kosuge et al. | |
|---|---|---|---|---|
| 6,453,583 | B1 * | 9/2002 | Hanafusa | E01H 5/04 37/246 |
| 6,705,028 | B2 * | 3/2004 | Hanafusa | E01H 5/04 37/246 |
| 8,042,431 | B2 * | 10/2011 | Nakata | F16H 57/027 74/606 R |
| 9,435,091 | B2 * | 9/2016 | Kawakami | E01H 5/098 |
| 10,072,749 | B2 * | 9/2018 | Reth | B60K 17/3465 |
| 10,907,581 | B2 * | 2/2021 | Moroi | F02M 35/10327 |
| 11,156,136 | B2 * | 10/2021 | Hase | F02M 35/162 |
| 11,214,935 | B2 * | 1/2022 | Mandeville | B62D 55/08 |

FOREIGN PATENT DOCUMENTS

| CN | 111623109 | A | * | 9/2020 | ........... F16H 57/027 |
|---|---|---|---|---|---|
| DE | 102010001392 | A1 | * | 8/2010 | ............. E01H 5/04 |
| DE | 102020204589 | A1 | * | 11/2020 | ........... F16H 57/027 |
| JP | H06117521 | A | * | 4/1994 | |
| JP | H11303975 | A | | 11/1999 | |
| JP | 2017115305 | A | | 6/2017 | |
| JP | 2023048569 | A | * | 4/2023 | |

* cited by examiner

*Primary Examiner* — Adam D Rogers
(74) *Attorney, Agent, or Firm* — Armstrong Teasdale LLP (57) ABSTRACT

A breather device (140) for a gear case (82) defining a gear chamber (83) therein, comprising a breather chamber (146) defined in a part of the gear case; a breathing hole (152) formed in a wall part defining an upper part of the breather chamber so as to communicate the breather chamber with outside; a communication hole (148, 150) formed in a wall part separating a lower part of the breather chamber from the gear chamber so as to communicate the breather chamber with the gear chamber; and a separating wall (154) extending partly across the breather chamber so as to define a circuitous passage between the breathing hole and the communication hole.

6 Claims, 7 Drawing Sheets

WORK MACHINE HAVING A BREATHER DEVICE FOR GEAR CASE

TECHNICAL FIELD

The present disclosure relates to a breather device for a gear case.

BACKGROUND ART

In recent years, efforts have been made to provide access to sustainable transport systems that take into account the most vulnerable transport participants. In order to achieve this goal, the inventors of this application have focused on research and development efforts to further improve the safety of traffic and the convenience of movement and life through research and development for snow throwers.

In the field of snow throwers, it is known to electrically adjust the ground height of the auger for removing the snow (See JP2017-115305A, for instance). For this purpose, the output of an electric motor is transmitted to a lifting mechanism for height adjustment via a gear train received in a gear case. Since snow throwers typically operate in a wet environment, it is important for the gear case to be protected from water while being provided with an air breathing hole in the gear case to allow the interior of the gear case to be communicated with the outside. JP3697597B2 discloses such a breathing hole.

Since the gear case typically contains lubricating oil for the lubrication of the gear mechanism, it is necessary to prevent the lubricating oil from leaking from the breathing hole.

However, according to the conventional arrangement, it is difficult to avoid the leakage of lubricating oil under all conditions, particularly when the work machine on which the gear case is mounted changes the attitude thereof, for instance by tilting forward and rearward during use.

SUMMARY OF THE INVENTION

In view of such a problem of the prior art, a primary object of the present invention is to provide a breather device for a gear case that allows external air to be introduced into and discharged from the interior of the gear case while preventing intrusion of water into the gear case via the breather device, and thereby to contribute to the development of sustainable transportation systems and comfortable life styles.

To achieve such an object, a certain aspect of the present invention provides a breather device (140) for a gear case (82) defining a gear chamber (83) therein, comprising a breather chamber (146) defined in a part of the gear case; a breathing hole (152) formed in a wall part (146E) defining an upper part of the breather chamber so as to communicate the breather chamber with outside; a communication hole (148, 150) formed in a wall part (146B) separating a lower part of the breather chamber from the gear chamber so as to communicate the breather chamber with the gear chamber; and a separating wall (154) extending partly across the breather chamber so as to define a circuitous passage between the breathing hole and the communication hole.

Thereby, the oil in the gear case is prevented from leaking to the outside through the breathing hole, and the breathing hole allows the introduction and discharge of air from and out of the gear case in a favorable manner at the same time.

Preferably, in this breather device, the breather chamber is elongated in a prescribed direction, and the separating wall includes a first section (154A) extending vertically from an upper wall part of the breather chamber, and a second section (154B) extending from a lower end of the first section in the prescribed direction so as to be interposed between the breathing hole and the communication hole and define a gap (156) between a tip end of the second section and an opposing peripheral wall part of the breather chamber.

Thereby, even when the vehicle is tilted in the prescribed direction, the separating wall effectively prevents oil from flowing toward the breathing hole while allowing air to freely flow through the small gap.

Preferably, in this breather device, the gear case is configured to be mounted on a work machine that tilts in a fore and aft direction of the work machine during operation, and the prescribed direction coincides with the fore and aft direction of the work machine.

Thereby, even when the lubricating oil should pass through the small gap, the lubricating oil can be returned to the part of the breather chamber below the separating wall, and hence back into the gear chamber when the work machine is tilted forward or rearward during the operation of the work machine.

Preferably, in this breather device, the breathing hole is positioned in a part of the breather chamber adjacent to an upper end and a front end of the breather chamber.

Thereby, the lubricating oil which has reached the breather chamber is prevented from leaking out of the breathing hole.

Preferably, in this breather device, the communication hole is provided in a front part of the wall part separating a lower part of the breather chamber from the gear chamber, respectively.

Thereby, the lubricating oil that has entered the breather chamber can be favorably returned to the gear chamber via the communication hole when the work machine is tilted forward during the operation of the work machine.

Preferably, in this breather device, the communication hole includes a front communication hole (148) and a rear communication hole (150) provided in a front and a rear part of the wall part separating a lower part of the breather chamber from the gear chamber, respectively.

Thereby, the lubricating oil that has entered the breather chamber can be favorably returned to the gear chamber via the front communication hole or the rear communication hole when the work machine is tilted forward or rearward during the operation of the work machine.

Preferably, in this breather device, the rear communication hole is provided with a larger opening area than the front communication hole.

The work machine is tilted rearward more often and more severely than forward so that the lubricating oil can be particularly favorably returned to the gear chamber.

Preferably, in this breather device, the gear case is provided with an upper extension (82I) defining a recess (82H) separated from the gear chamber and having an open side facing sideways, and the open side of the recess is closed by a lid plate (142) so as to define the breather chamber jointly with the upper extension.

Thereby, the breather chamber can be defined in a compact and economical manner.

Preferably, the work machine includes a lower body (12) equipped with a travel unit (16), and an upper body (14) equipped with a work unit (56), and pivotally supported by the lower body around a laterally extending pivot shaft (24) for vertical adjustment of the work unit, the breather device being mount on the upper body.

Thus, according to this aspect of the present invention, without regard to the adjusted height of the upper body relative to the lower body, the lubricating oil that has entered the breather chamber can be returned to the gear chamber in a favorable manner.

The present invention thus provides a breather device for a gear case that allows external air to be introduced into and discharged from the interior of the gear case while preventing intrusion of water into the gear case via the breather device.

DESCRIPTION OF THE PREFERRED EMBODIMENT(S)

A preferred embodiment of the present invention as applied to a snow blower will be described in the following with reference to the appended drawings.

Figure 1:
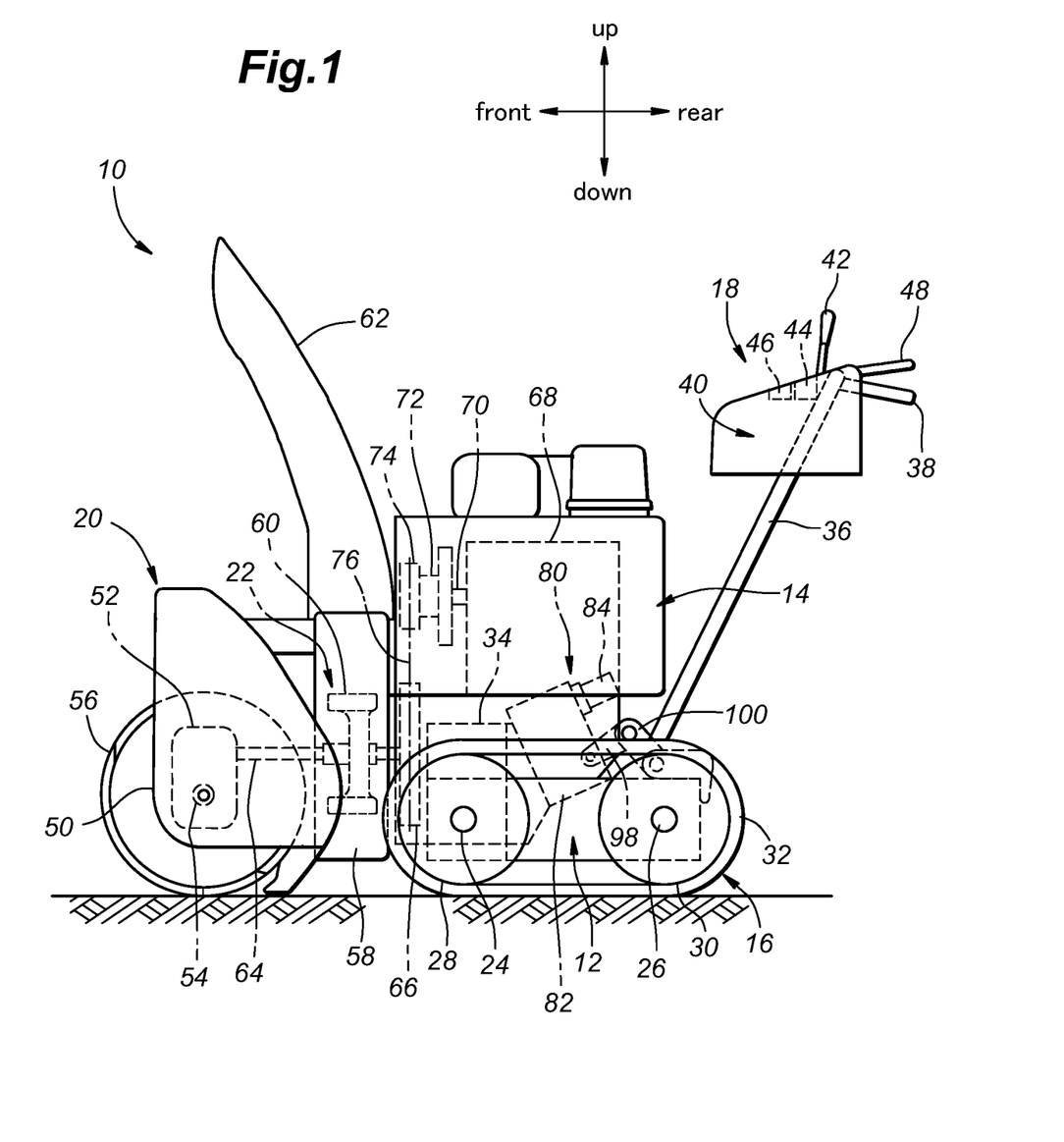
FIG. 1 is a side view of a snow blower provided with a breather device for an electric motor according to an embodiment of the present invention.
Figure 2:
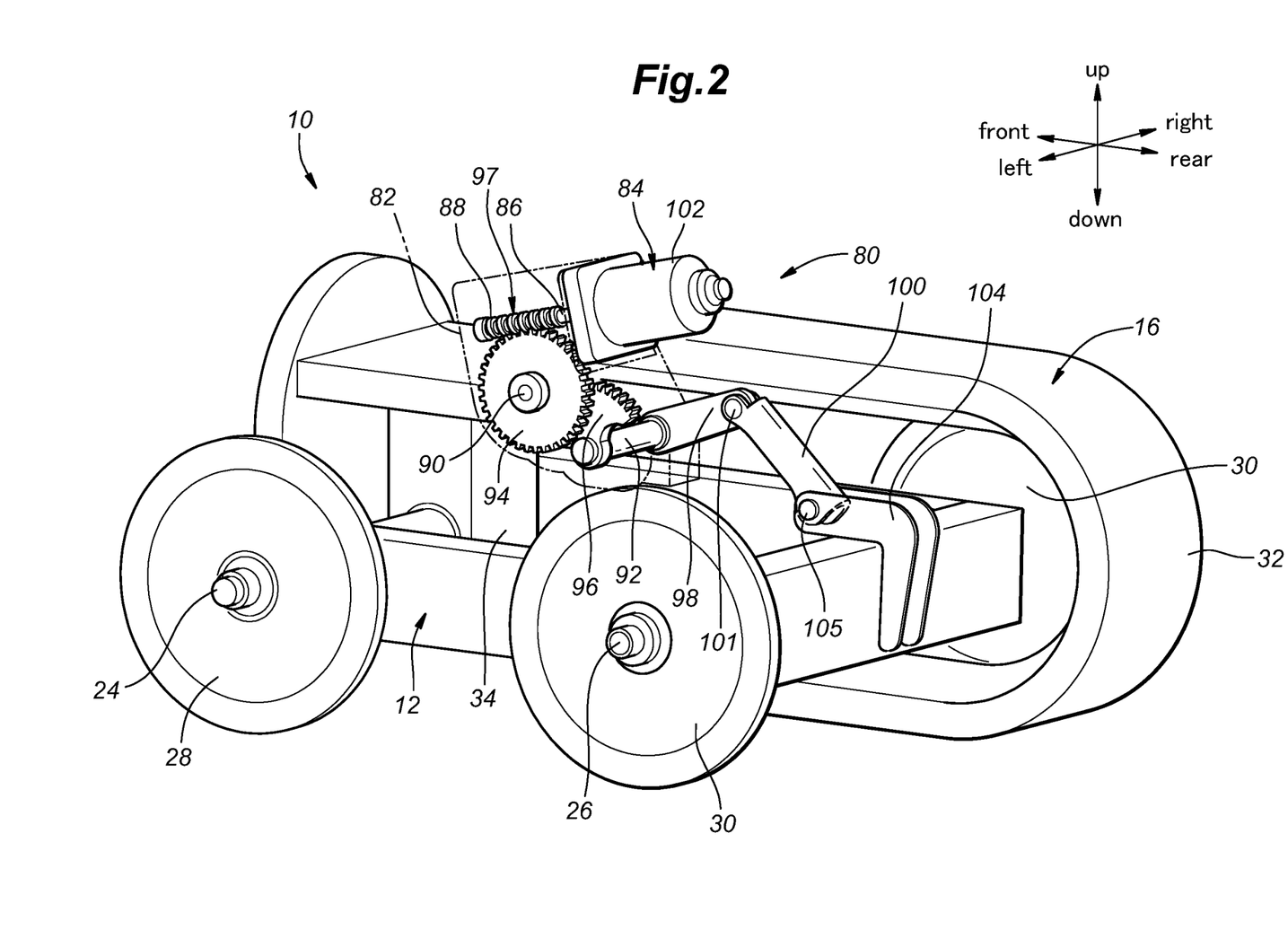
FIG. 2 is a perspective view of a mechanism for raising an upper body of the snow blower relative to a lower body of the snow blower.

FIGS. 1 and 2 show the overall structure of the snow blower 10 which in this case consists of a walk-behind snow blower 10.

The snow blower 10 is provided with a lower body (travel frame) 12 and an upper body (main body frame) 14 pivotally mounted to the lower body 12 as will be described hereinafter. The lower body 12 is fitted with a travel unit 16 and a steering unit 18. The upper body 14 is fitted with an auger device 20 and a blower device 22 for removing snow from the road surface.

The travel unit 16 includes a front shaft 24 extending laterally in a front part of the lower body 12 in a rotatable manner, a rear shaft 26 extending laterally in a rear part of the lower body 12 in a rotatable manner, a pair of driven wheels 28 fitted to either lateral end of the front shaft 24, a pair of idle wheels 30 fitted to either lateral end of the rear shaft 26, a pair of crawlers 32 each passed around the driven wheel 28 and the idle wheel 30 on the corresponding side, and a travel drive unit 34 that drives the driven wheels 28 via the front shaft 24. In FIG. 2, the crawler 32 on the left side is omitted from illustration.

The steering unit 18 is provided with a pair of arms 36 extending rearward and upward from either side of a rear part of the lower body 12, a pair of grips 38 provided at the rear (upper) ends of the arms 36, respectively, and an input unit 40 attached to the upper end parts of the arms 36. The grips 38 are configured to be gripped by the operator.

The input unit 40 is configured to receive input operations performed by the operator, and includes a travel lever 42 that receives a travel operation of the travel unit 16, a snow removal switch 44 that receives a snow removal operation of the auger device 20 and the blower device 22, a height adjustment switch 46 that accepts a height adjustment operation of the upper body 14, which will be described hereinafter, and a clutch lever 48 that accepts an operation of a deadman's clutch 72, which will be described hereinafter.

The auger device 20 includes an auger housing 50 attached to the upper body 14 via a blower case 58, which will be described hereinafter, a gear case 52 attached to the auger housing 50, an auger shaft 54 extending laterally through the gear case 52, and an auger 56 (a work unit) attached to the auger shaft 54. A drive shaft 64 serving as an input shaft of the gear case 52 extends rearward from the gear case 52.

The blower device 22 includes a blower case 58 attached to the upper body 14, a blower 60 supported by the drive shaft 64 so as to be rotatable in the blower case 58, and a discharge chute 62 attached to the top of the blower case 58.

An internal combustion engine 68 is mounted to an upper part of the upper body 14, and is provided with an output shaft 70 extending forward. A small-diameter drive pulley 74 is attached to the output shaft 70 via a deadman's clutch 72. A large diameter driven pulley 66 is attached to the rear end of the drive shaft 64 which extends into the upper body 14. An endless belt 76 is passed around the drive pulley 74 and the driven pulley 66.

Thus, the power of the internal combustion engine 68 is transmitted from the output shaft 70 to the drive shaft 64 via the pulley mechanism, and rotates the auger 56 via a gear mechanism (not shown) in the gear case 52 at the same time as rotating the blower 60 supported by the drive shaft 64.

As a result, the rotation of the output shaft 70 is transmitted to the drive shaft 64 via the deadman's clutch 72, the drive pulley 74, the endless belt 76 and the driven pulley 66 so that the auger 56 and the blower 60 are driven in synchronism.

As the snow blower 10 travels forward, the auger 56 crushes the snow in front of the snow blower 10, and gathers the crushed snow to a laterally central part of the auger housing 50. The blower 60 forces the collected snow upward through the discharge chute 62, and throws out the snow from the upper end of the discharge chute 62.

For a favorable snow removal operation, it is desirable that the elevation or the ground height of the auger 56 can be adjusted. In this embodiment, to accomplish this goal, the upper body 14 can be raised and lowered with respect to the lower body 12 by pivotably supporting the upper body 14 on the lower body 12 via a laterally extending shaft, in particular the front shaft 24. The upper body 14 is provided with a lift device 80 that provides the power required for raising the upper body 14 relative to the lower body 12.

The lift device 80 includes a gear train 97 housed in a laterally slim, box-shaped gear case 82 (FIG. 5) which is fixed to the upper body 14, and an electric motor 84 housed in a substantially cylindrical motor case 102 which is connected to an upper part of the gear case 82 via a flange connection. A shown in FIG. 3, the electric motor 84 has an output shaft 86 projecting forward from the motor case 102. The gear case 82 internally defines a gear chamber 83, and the motor case 102 internally defines an internal chamber 103.

Figure 3:
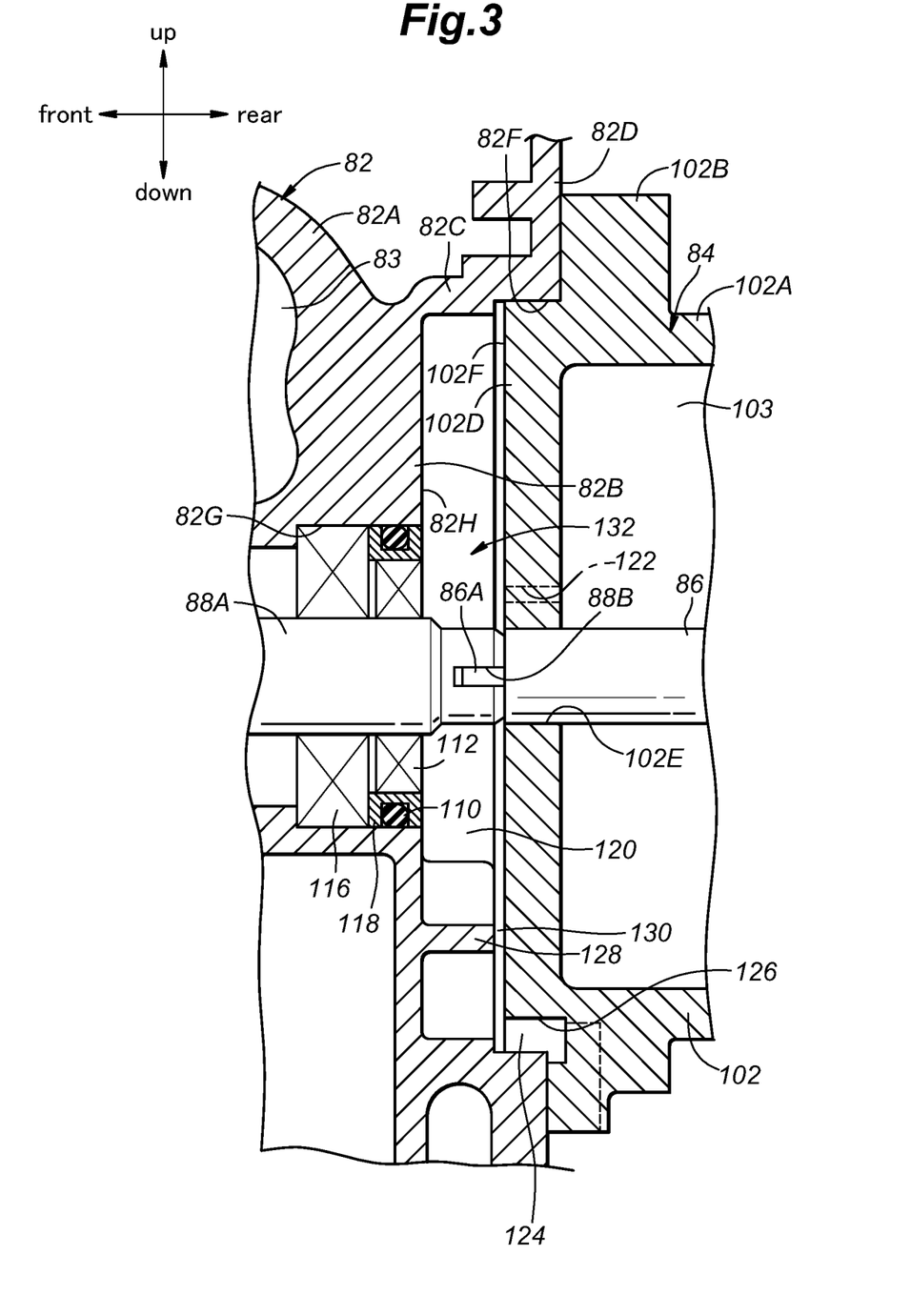
FIG. 3 is a fragmentary section view of the breather device provided between the motor case of the motor and the gear case of a gear train.

The gear train 97 has an input shaft 88A which projects rearward in a coaxial relationship to the output shaft 86 of the electric motor 84. The front end of the motor output shaft 86 is provided with a key 86A projecting forward from the front end of the output shaft 86, and having a rectangular parallelepiped shape. The rear end of the input shaft 88A is provided with an engagement slot 88B which is configured to complementarily receive the key 86A of the motor output shaft 86. Owing to this engagement, the motor output shaft 86 and the input shaft 88A of the gear train 97 are connected to each other in a torque transmitting relationship so that the rotation of the motor output shaft 86 is transmitted to the gear train 97.

The input shaft 88A of the gear train 97 is fitted with a worm 88 which meshes with a spur gear 94 supported by an intermediate shaft 90 in the gear chamber 83. The spur gear 94 is coaxially fitted with a pinion (not shown in the drawings) which meshes with a sector gear 96 supported by a gear output shaft 92 in the gear chamber 83. The motor output shaft 86 and the input shaft 88A extend in the fore and aft direction with a slight downward inclination, and the intermediate shaft 90 and the output shaft 92 of the gear case 82 extend laterally. Thus, the rotation of the motor output shaft 86 of the electric motor 84 is decelerated, and transmitted to the gear output shaft 92 extending laterally from the gear case 82 via the gear train 97 formed by the worm 88, the spur gear 94, and the sector gear 96.

Figure 7A:
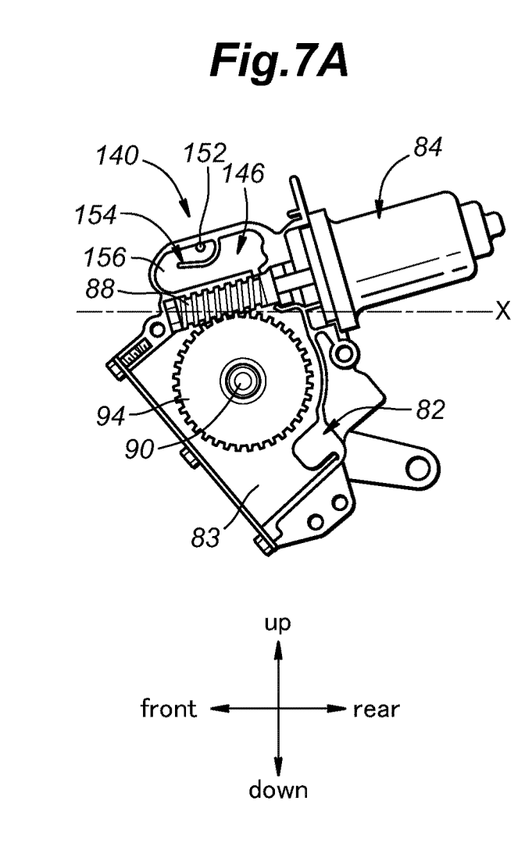
FIGS. 7A to 7C are side views of the gear case and the breather device at different tilt angles.
Figure 7B:
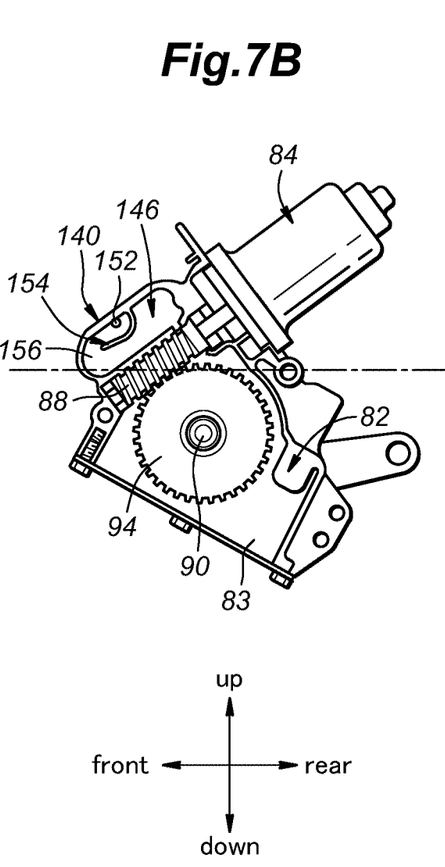
Figure 7C:
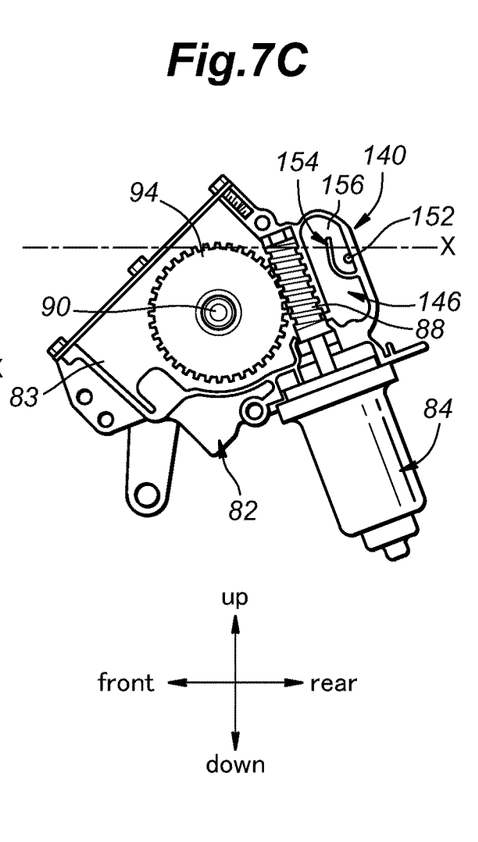

The gear chamber 83 is filled with oil to keep the gear train 97 lubricated. The amount of oil that is received the gear chamber 83 is selected such that the oil level X is always above the meshing part between the worm 88 and the spur gear 94 (the highest meshing part in the gear train 97), but below the bottom wall of the breather chamber 146 without regard to the position of the upper body 14; the upper body 14 may be horizontal as shown in FIG. 7A, tilted forward as shown in FIG. 7B, and tilted rearward as shown in FIG. 7C.

The output shaft 92 of the gear case 82 projects laterally out of the gear case 82, and is fixedly connected to an end of a link arm 98. The other end of the link arm 98 is pivotally connected to an end of a link bar 100, via a pivot pin 101, and the other end of the link bar 100 is pivotally connected to a bracket 104 (which is fixedly attached to the lower body 12) via a pivot pin 105.

Thus, the output shaft 92 of the gear case 82 mounted on the upper body 14 is connected to the lower body 12 via a link mechanism consisting of the link arm 98 and the link bar 100.

As the output shaft 92 is rotationally actuated by the electric motor 84, the bending angle between the link arm 98 and the link bar 100 changes with the result that the tilting angle of the upper body 14 relative to the lower body 12 about the front shaft 24 changes in a corresponding manner. This in turn causes the elevation of the auger 56 relative to the road surface to be changed. As shown in FIG. 2, the output shaft 86 of the electric motor 84 tilts slightly downward relative to the horizontal direction when the upper body 14 is lowered. When the upper body 14 is raised, the output shaft 86 of the electric motor 84 tilts upward relative to the horizontal direction. However, in the following disclosure, the output shaft 86 of the electric motor 84 will be described as extending substantially horizontally.

The motor case 102 is provided with a breather device for permitting air to get into and out of the motor case 102 while protecting the motor case 102 from the intrusion of moisture or other foreign manners. The breather device will be described in the following with reference to FIGS. 3 to 7.

The motor case 102 includes a cylindrical main part 102A and a radial flange 102B formed at the front end of the main part 102A. The main part 102A defines the internal chamber 103 (see FIG. 3) that houses the stator, rotor and the like which are not shown in the drawings. Three bolt holes (not shown in the drawings) are formed in the radial flange 102B.

The gear case 82 includes a box-shaped main part 82A that houses the gear train 97, an end wall 82B provided at an upper rear part of the main part 82A, a cylindrical part 82C extending rearward from the peripheral part of the end wall 82B, and a radial flange 82D formed at the rear end of the cylindrical part 82C. Three threaded holes 82E (see FIGS. 4 and 5) are formed in the radial flange 82D.

Figure 4:
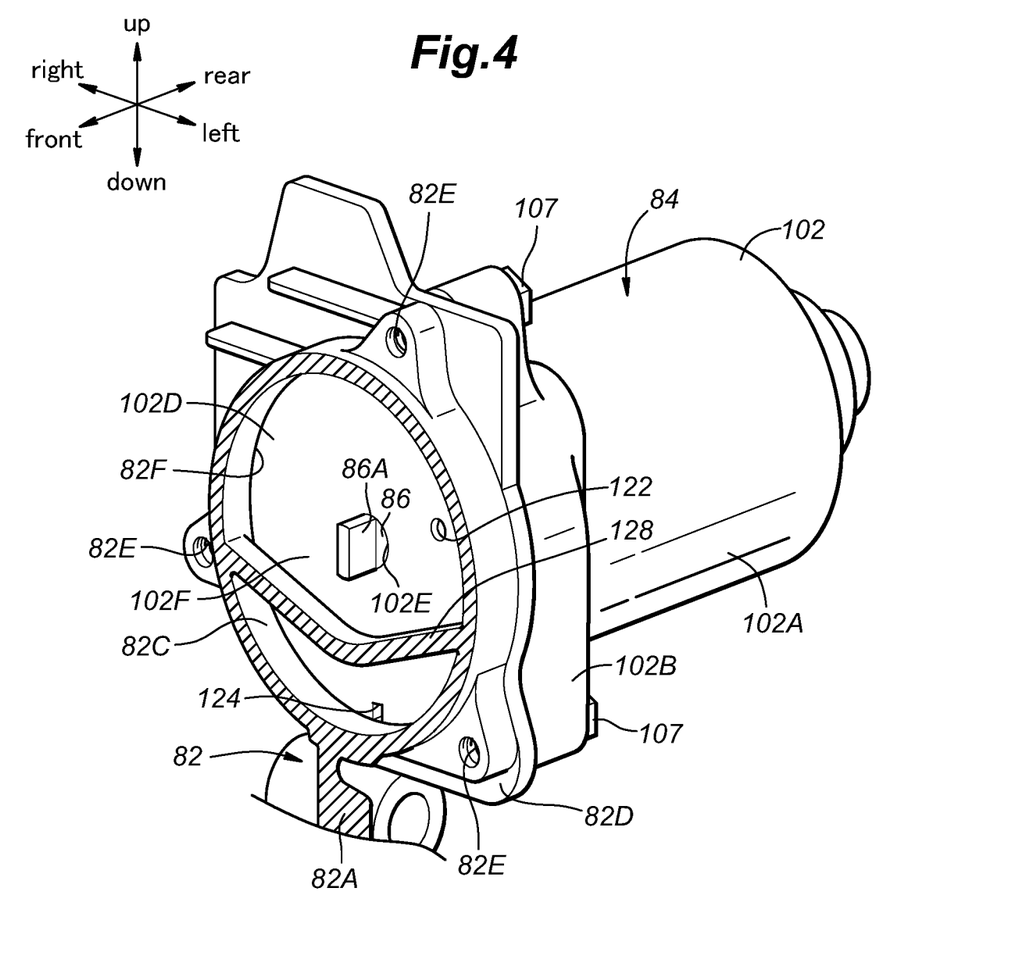
FIG. 4 is a cross sectional perspective view of the breather device cut through a part of the gear case.

As shown in FIG. 4, a bolt 107 is passed into each bolt through hole via a metal collar member not shown in the drawings from the side of the electric motor 84, and is threaded into the corresponding threaded hole 82E in the radial flange 82D of the gear case 82 so that the motor case 102 is connected to the rear end of the gear case 82.

The motor case 102 is provided with a circular end wall 102D at the front end thereof. The end wall 102D is centrally provided with a through hole 102E through which the output shaft 86 of the electric motor 84 passes. As shown in FIG. 3, the end wall 102D is axially offset forward from the radial flange 102B so that a cylindrical peripheral surface of the end wall 102D projects forward (or toward the gear case 82) from the front surface of the radial flange 102B. As shown in FIG. 3, the rear end of the gear case 82 is provided with a cylindrical recess 120 which defines a planar bottom surface, and a peripheral inner surface. The rear part of the peripheral inner surface of the cylindrical recess 120 consists of a cylindrical surface 82F concentric to the output shaft 86 of the electric motor 84. The cylindrical surface 82F is complementary to and snugly receives the outer peripheral surface of the end wall 102D of the motor case 102.

As shown in FIG. 3, the end wall 82B of the gear case 82 is centrally provided with a through hole 82G through which the gear input shaft 88A passes. The through hole 82G is fitted with a roller bearing 116, and the annular space defined between the inner peripheral surface of the through hole 82G and the outer peripheral surface of the input shaft 88A is sealed by a sealing device that includes an oil seal 112 surrounding the input shaft 88A, an oil seal retainer 118, and an O ring 110 interposed between the oil seal retainer 118 and the inner peripheral surface of the through hole 82G.

Owing to the complementary engagement between the outer peripheral surface 126 of the end wall 102D of the motor case 102 and the cylindrical surface 82F of the cylindrical part 82C of the gear case 82, the motor output shaft 86 and the input shaft 88A of the gear train 97 can be easily and reliably aligned to each other.

The front part of the cylindrical recess 120 defines a cylindrical surface having a smaller diameter than the cylindrical surface 82F of the rear part of the cylindrical recess 120 so that an annular shoulder surface facing the axial direction (rearward) is defined in an axially middle part of the cylindrical recess 120. Thus, when the motor case 102 is joined to the gear case 82, the front end of the end wall 102D of the motor case 102 abuts against this shoulder surface with the result that a gap is created between the bottom surface of the cylindrical recess 120 and the front surface of the end wall 102D of the motor case 102. Thus, a substantially enclosed cylindrical chamber which will be referred to as a breather chamber 132 is defined between the bottom surface of the recess 120 and the front surface of the end wall 102D of the motor case 102.

The end wall 102D of the motor case 102 is provided with a motor communication hole (air breathing hole) 122 that communicates the breather chamber 132 with the internal chamber 103 of the motor case 102. The motor communication hole 122 is provided obliquely above (or laterally spaced from) the motor shaft through hole 102E through which the output shaft 86 passes.

Figure 5:
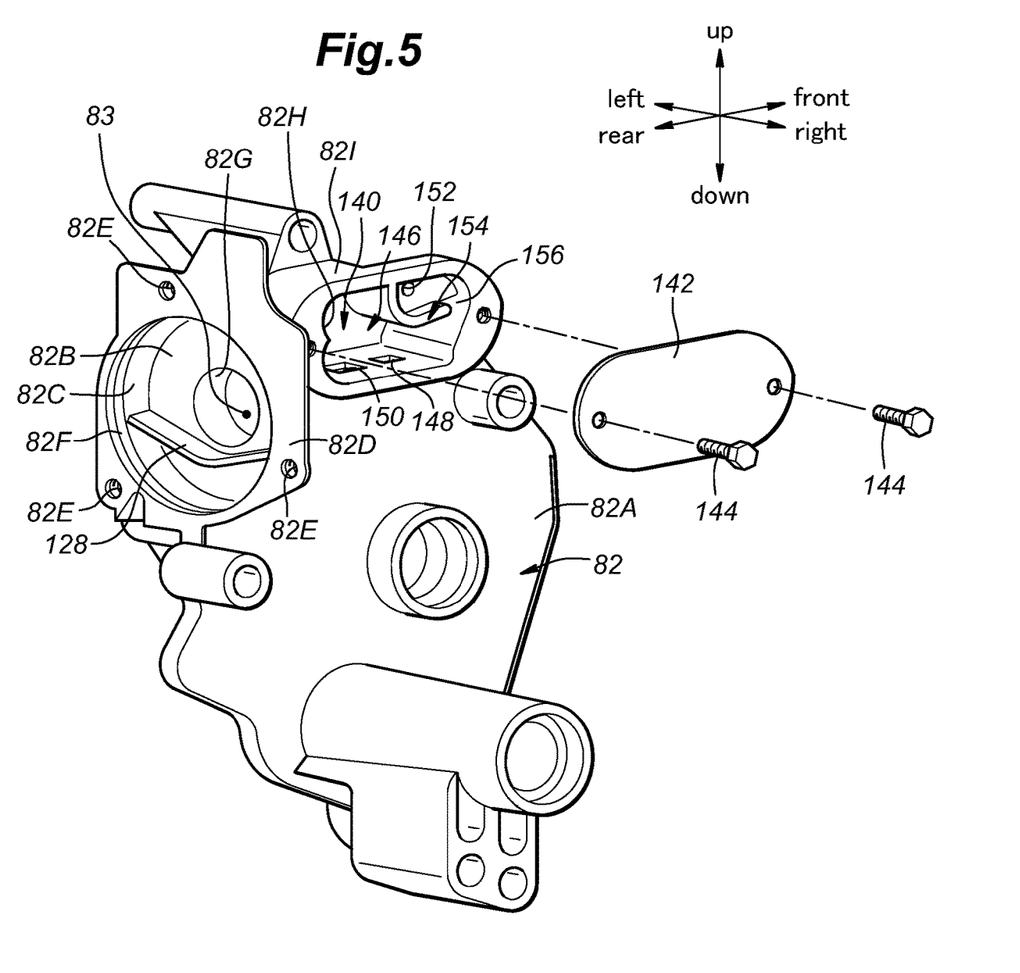
FIG. 5 is an exploded perspective view of the gear case.

As shown in FIGS. 3 to 5, the end wall 82B of the gear case 82 is provided with a partition wall 128 projecting from the end wall 82B of the gear case 82 toward the end wall 102D of the motor case 102, and extending substantially laterally across the end wall 82B. A small gap 130 (FIG. 3) is defined between the free end of the partition wall 128 and the end wall 102D of the motor case 102. The partition wall 128 is slightly bent or dips downward in a laterally middle part 128B thereof so as to present a substantially V-shape as viewed in the axial direction.

The end wall 82B and the radial flange 82D of the gear case 82 and the end wall 102D and the radial flange 102B of the motor case 102 cooperate with each other to define an external communication hole 124. External communication hole 124 opens breather chamber 120 to the outside.

Figure 6:
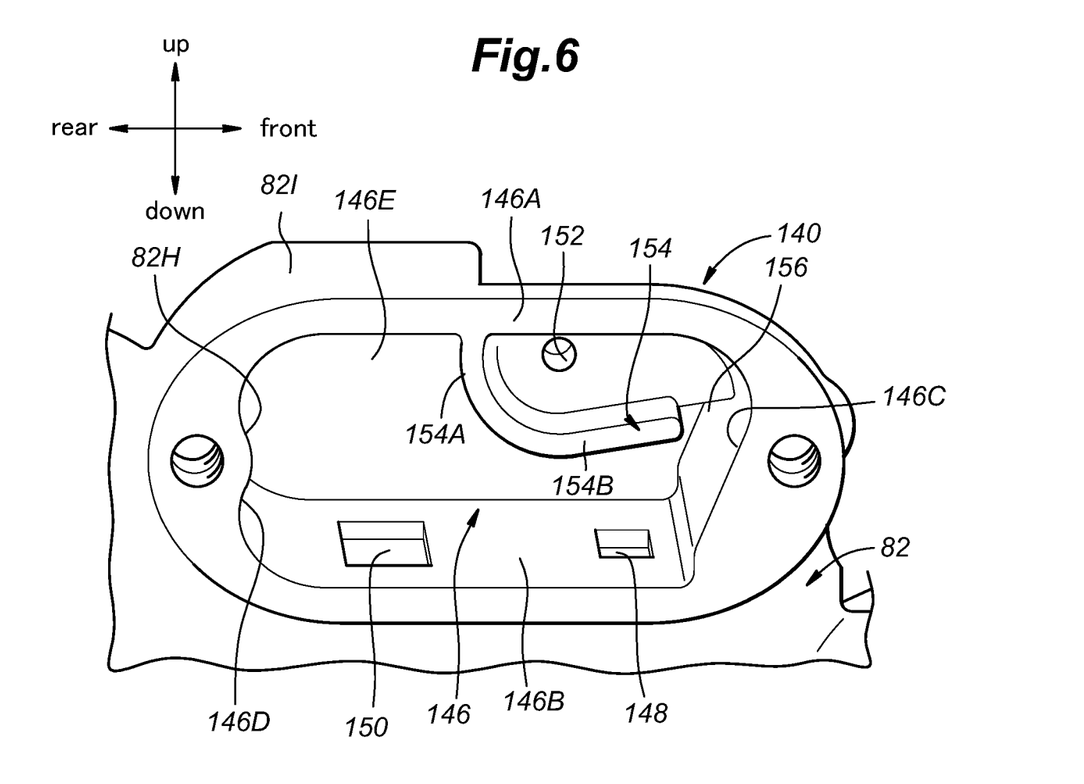
FIG. 6 is an enlarged perspective view of the breather device for the gear case with a cover plate omitted from illustration.

As shown in FIGS. 5 and 6, the gear case 82 is provided with a gear case breather device 140 that includes a breather chamber 146 defined as a recess 82H formed in an upper extension 82I of the main part 82A of the gear case 82. The recess 82H has an open end facing the right side thereof which is closed by a cover plate 142 attached thereto by a pair of bolts 144. The upper extension 82I includes an upper wall 146A, a lower wall 146B, a front wall 146C, a rear wall 146D and a side wall 146E. The side of the recess 82H opposing the side wall 146E defines the open end. The breather chamber 146 defined by these walls and the cover plate 142 has a relatively small lateral dimension, and has a relatively large fore and aft and vertical dimensions. The fore and aft dimension of the breather chamber 146 is greater than the vertical dimension thereof.

The side wall 146E is provided with a breathing hole 152 that communicates an upper part of the breather chamber 146 with the outside. A front communication hole 148 is formed in a front part of the lower wall 146B, and a rear communication hole 150 is formed in a rear part of the lower wall 146B. The front communication hole 148 and the rear communication hole 150 pass through the lower wall 146B and communicate the lower part of the breather chamber 146 with the gear chamber 83. The opening area of the rear communication hole 150 is larger than the opening area of the front communication hole 148.

A separating wall 154 extends inside the breather chamber 146 so as to communicate the breathing hole 152 with the front communication hole 148 and the rear communication hole 150 via a circuitous passage instead of directly communicating the breathing hole 152 with the front communication hole 148 and the rear communication hole 150. The edge of the separating wall 154 remote from the side wall 146E substantially abuts against the cover plate 142 or, alternatively, defines a small gap. In the illustrated embodiment, the separating wall 154 is L-shaped as viewed in the lateral direction by including a vertical section 154A extending downward from the upper wall 146A of the breather chamber 146 and a lateral section 154B extending from the lower end of the vertical section 154A laterally toward the front wall of the breather chamber 146 (or to a point at a small distance to the opposing front wall 146C of the breather chamber 146). Thus, a small gap 156 is defined between the tip end of the lateral section 154B and the opposing front wall 146C.

Owing to the positioning of the breathing hole 152 in an upper front part of the breather chamber 146, the breathing hole 152 is positioned above the oil level X of the lubricating oil when the gear case 82 is in the horizontal posture shown in FIG. 7A and when the gear case 82 is in the most forwardly tilted posture shown in FIG. 7B. When the gear case in the most rearwardly tilted position shown in FIG. 7C, the breathing hole 152 may be positioned below the oil level X, but the lubricating oil is prevented from reaching the breathing hole 152 by the separating wall 154.

The mode of operation of the snow blower 10 of the illustrated embodiment will be described in the following with reference to FIG. 1. When the operator operates the travel lever 42 of the input unit 40, the travel drive unit 34 is activated, and the driven wheels 28 are rotationally driven via the front shaft 24. As a result, the crawler 32 rotates and the snow blower 10 travels forward.

When the operator operates the snow removal switch 44 of the input unit 40, the blower 60 and the auger 56 are operated by the internal combustion engine 68 via the output shaft 70. More specifically, the torque output of the internal combustion engine 68 is transmitted from the output shaft 70 to the drive shaft 64 via the deadman's clutch 72, the drive pulley 74, the endless belt 76 and the driven pulley 66 with the result that the blower 60 and the auger 56 rotate. The auger 56 crushes the snow in front of the snow blower 10 and collects the crushed snow in the laterally central part of the auger housing 50. The collected snow is introduced into the blower case 58 and thrown from the chute 62 in the desired direction by the rotation of the blower 60.

When the operator operates the height adjustment switch 46, the electric motor 84 is rotationally driven, and the rotation of output shaft 86 thereof is transmitted to the gear output shaft 92 via the gear train 97 in the gear case 82. As a result, the upper body 14 pivots around the front shaft 24 in a substantially vertical direction with respect to the lower body 12 with the result that the ground height of the auger 56 is adjusted.

When the internal pressure of the gear chamber 83 rises due to the heat generated by the rotation of the gear train 97, the air in the gear chamber 83 enters the breather chamber 146 through the front communication hole 148 and the rear communication hole 150 and is released to the outside through the breathing hole 152. When the internal pressure of the gear chamber 83 drops, air flows in the opposite direction. Thereby, the internal pressure of the gear chamber 83 is maintained at the atmospheric pressure at all times.

When the oil level X of the gear chamber 83 fluctuates due to vibration or the like, the oil in the gear chamber 83 may enter the breather chamber 146 through the front communication hole 148 or the rear communication hole 150. The intrusion of oil into the breather chamber 146 is likely to occur when the upper body 14 is tilted relative to the lower body 12 in the most forwardly tilted state shown in FIG. 7B and in the most rearwardly tilted state shown in FIG. 7C.

However, even if the oil in the gear chamber 83 enters the breather chamber 146, the separating wall 154 prevents the oil from reaching the breathing hole 152 at all times. As a result, the oil is prevented from leaking out from the breathing hole 152 at all times.

Since the breathing hole 152 is formed near the upper wall 146A that encloses the breather chamber 146 from above, the oil in the gear chamber 83 is less likely to leak outside through the breathing hole 152.

In particular, since the separating wall 154 includes the vertical section 154A extending vertically at the rear of the breathing hole 152 and the lateral section 154B extending forward from the lower end of the vertical section 154A, the separating wall 154 is particularly effective in preventing oil from reaching the breathing hole 152 even when the gear case 82 is tilted rearward.

Even when oil should enter the breather chamber 146, the oil is readily returned to the gear chamber 83 via the front communication hole 148 when tilted forward, and via the rear communication hole 150 when tilted rearward. As a result, no significant amount of oil is trapped in the breather chamber 146 at any given moment. Since the opening area of the rear communication hole 150 is larger than that of the front communication hole 148, the oil returns particularly swiftly from the rear communication hole 150 to the gear chamber 83 when the snow blower 10 is tilted rearward.

Even if the oil that has entered the breather chamber 146 should reach the breathing hole 152 via the small gap 153, the oil is readily returned to the lower part of the breather chamber 146 via the small gap 153 as soon as the gear case 82 or the snow blower 10 is tilted forward. As a result, oil is not likely to be deposited in an upper part of the gear case 82 in normal operation of the snow blower 10.

For this reason as well, the oil in the gear chamber 83 is not likely to leak outside through the breathing hole 152.

Although the present invention has been described in terms of a preferred embodiment thereof, it should be readily apparent to those skilled in the art that the present invention is not limited to such an embodiment, and can be modified in various ways without departing from the scope of the present invention. For example, the rear communication hole 150 may be omitted and only the front communication hole 148 may be provided. The separating wall 154 may extend completely between the upper wall 146A and the front wall 146C, and a hole may be formed in a part of the front wall 146C near the front wall 146C, instead of providing a small gap 156 between the separating wall 154 and the front wall 146C.

The gear case breather device of the present embodiment is not limited to the use in a snow blower 10, but can be applied to various other work machines having a gear case 82 employed therein.

In addition, not all of the components shown in the above embodiment are essential for the present invention, and can be omitted or substituted as appropriate without departing from the gist of the present invention.

The invention claimed is:

1. A work machine, comprising
a lower body equipped with a travel unit;
an upper body equipped with a work unit, and pivotally supported by the lower body around a laterally extending pivot shaft for vertical adjustment of the work unit;
a lift device fixed to the upper body, which includes a gear case mounted on the upper body and an output shaft connected to the lower body via a link mechanism and provides the power required for raising the upper body relative to the lower body; and
a breather device provided on the gear case defining a gear chamber therein,
wherein the breather device comprising
a breather chamber defined in a part of the gear case;
a breathing hole formed in a wall part defining an upper part of the breather chamber so as to communicate the breather chamber with outside;
a plurality of communication holes formed in a wall part separating a lower part of the breather chamber from the gear chamber so as to communicate the breather chamber with the gear chamber; and
a separating wall extending partly across the breather chamber so as to define a circuitous passage between the breathing hole and the communication holes, and
wherein the plurality of communication holes includes a front communication hole and a rear communication hole provided in a front and a rear part of the wall part separating the lower part of the breather chamber from the gear chamber, respectively.

2. The work machine according to claim 1, wherein the breather chamber is elongated in a prescribed direction, and the separating wall includes a first section extending vertically from an upper wall part of the breather chamber, and a second section extending from a lower end of the first section in the prescribed direction so as to be interposed between the breathing hole and the communication holes and define a gap between a tip end of the second section and an opposing peripheral wall part of the breather chamber.

3. The work machine according to claim 2, wherein the gear case is configured to be mounted on the work machine that tilts in a fore and aft direction during operation, and the prescribed direction coincides with the fore and aft direction of the work machine.

4. The work machine according to claim 3, wherein the breathing hole is positioned in a part of the breather chamber adjacent to an upper end and a front end of the breather chamber.

5. The work machine according to claim 1, wherein the rear communication hole is provided with a larger opening area than the front communication hole.

6. The work machine according to claim 1, wherein the gear case is provided with an upper extension defining a recess separated from the gear chamber and having an open side facing sideways, and the open side of the recess is closed by a lid plate so as to define the breather chamber jointly with the upper extension.

* * * * *